United States Patent [19]

Ishii et al.

[11] Patent Number: 5,710,856
[45] Date of Patent: Jan. 20, 1998

[54] LIGHT REFLECTIVE SHEET AND LIGHT REFLECTOR USING IT

[75] Inventors: Toshiyuki Ishii; Katsumi Senba; Takayuki Kajihara, all of Aichi-ken; Naoko Takemura, Kanagawa-ken, all of Japan

[73] Assignee: Mitsui Toatsu Chemicals, Inc., Tokyo, Japan

[21] Appl. No.: 590,113

[22] Filed: Jan. 23, 1996

[30] Foreign Application Priority Data

Jan. 27, 1995 [JP] Japan ................ 7-011482

[51] Int. Cl.$^6$ ................ G02B 6/10; F21V 7/04
[52] U.S. Cl. ................ 385/146; 385/129; 385/130; 385/131; 385/141; 385/145; 385/901; 362/31
[58] Field of Search ................ 385/14, 15, 24, 385/31, 38, 49, 129, 130, 131, 141, 143, 145, 901, 146, 147; 362/31, 32

[56] References Cited

U.S. PATENT DOCUMENTS

| | | | |
|---|---|---|---|
| 4,519,154 | 5/1985 | Molari, Jr. | 40/615 |
| 4,961,617 | 10/1990 | Shahidi et al. | 385/901 X |
| 4,996,632 | 2/1991 | Aikens | 385/901 X |
| 5,042,892 | 8/1991 | Chiu et al. | 385/114 |
| 5,050,946 | 9/1991 | Hathaway et al. | 385/33 |
| 5,122,906 | 6/1992 | Wheatley | 359/586 |
| 5,187,765 | 2/1993 | Muehlemann et al. | 385/115 |
| 5,226,105 | 7/1993 | Myers | 385/147 |
| 5,237,641 | 8/1993 | Jacobson et al. | 385/146 |
| 5,339,179 | 8/1994 | Rudisill et al. | 385/901 X |
| 5,346,954 | 9/1994 | Wu et al. | 525/85 |
| 5,438,484 | 8/1995 | Kanda et al. | 362/31 |
| 5,461,548 | 10/1995 | Esslinger et al. | 362/32 |
| 5,594,830 | 1/1997 | Winston et al. | 385/901 X |
| 5,606,634 | 2/1997 | LeBihan | 385/901 X |
| 5,608,837 | 3/1997 | Tai et al. | 385/146 |

FOREIGN PATENT DOCUMENTS

| | | | |
|---|---|---|---|
| 263698 | 4/1988 | European Pat. Off. | 385/141 X |
| 475110 | 3/1992 | European Pat. Off. | 385/141 X |
| 0496323 | 7/1992 | European Pat. Off. | 385/141 X |
| 562802 | 9/1993 | European Pat. Off. | 385/141 X |
| 63-161029 | 7/1988 | Japan | 385/141 X |
| 2-13925 | 1/1990 | Japan | 385/141 X |
| 4-239540 | 8/1992 | Japan | 385/141 X |
| 5-229053 | 9/1993 | Japan | 385/141 X |
| 6-298957 | 10/1994 | Japan | 385/141 X |

OTHER PUBLICATIONS

Patent Abstracts of Japan, vol. 95, No. 1, Feb. 28, 1995 & JP-A-06 298957 (Mitsui Toatsu Chemicals, Inc.), Oct. 25, 1994, (abstract).

Patent Abstracts of Japan, vol. 012, No. 433, (C-543), Nov. 15, 1988 & JP-A-63 161029 (*Toray Ind. Inc..), Jul. 4, 1988, (abstract).

*Primary Examiner*—Brian Healy
*Attorney, Agent, or Firm*—Burns, Doane, Swecker & Mathis

[57] ABSTRACT

A light reflective sheet is here disclosed which comprises a porous resin sheet and a protective layer laminated on at least one surface of the porous resin sheet; the porous resin sheet comprises a polyolefin resin and 100 to 300 parts by weight of a finely powdery inorganic filler with respect to 100 parts by weight of a polyolefin resin; the porous resin sheet is stretched at an area stretch magnification of 1.5 to 20 times; the light reflectance of the porous resin sheet at a wave length of 550 nm is 95% or more; and the stiffness of the light reflective sheet is at least 50 mm. A light reflector using the light reflective sheet is also disclosed. Preferably, the protective layer has a function as a UV light protective layer and/or a light leakage preventing auxiliary layer. The light reflective sheet is excellent in light resistant to ultraviolet light and the like, structure holding properties and light reflectivity, and so it is useful as a light reflective sheet for back light units of liquid crystal displays of word processors, personal computers, televisions and the like as well as lights, copying machines, projector system displays, facsimiles, electronic blackboards and the like.

31 Claims, 1 Drawing Sheet

LIGHT REFLECTIVE SHEET AND LIGHT REFLECTOR USING IT

BACKGROUND OF THE INVENTION (a) Field of the Invention

The present invention relates to a light reflective sheet and a light reflector. More specifically, the present invention relates to a light reflective sheet in which a protective layer is laminated on at least one surface of a porous resin sheet having a high light reflection efficiency to improve light resistance, light reflectance and/or structure holding properties, and a light reflector using the light reflective sheet. The light reflective sheet and the light reflector regarding the present invention are desirable as a light reflective sheet and a light reflector for use in back light units of liquid crystal displays of word processors, personal computers, televisions and the like, lights, copying machines, projector system displays, facsimiles, electronic blackboards, and the like.

(b) Description of the Prior Art

In recent years, light reflective sheets have been used in various fields, and in particular, a large number of the light reflective sheets have been utilized as main parts of liquid crystal displays of word processors, personal computers, televisions and the like. It is important that the light reflective sheets are of a thin type and permit saving energy. Furthermore, the area increase of each liquid crystal display and the improvement of display quality have been required, and for the achievement of these requirements, it is necessary to feed a large quantity of light to a liquid crystal portion. In order to permit the energy saving of the liquid crystal display, to accomplish the miniaturization and the thin structure of the liquid crystal display, and to increase the quantity of light fed from a back light unit of the liquid crystal display, the light reflective sheet must have a high light reflection efficiency, and so the light reflective sheet capable of supplying a high luminance has been required.

The back light unit of the liquid crystal display can be mechanically classified into a system in which a light source is directly put under the liquid crystal portion, and a system in which the light source is put beside a transparent light guide plate. For the purpose of thinning the liquid crystal display, the latter system is desirable. In this latter system, a part of light passing through the transparent light guide plate is transmitted to the liquid crystal portion, and the remainder of the light passing through the transparent light guide plate is reflected on the light reflective sheet and then returned to the transparent light guide plate to effectively utilize the light. Therefore, owing to the leakage of the light between the transparent light guide plate and the light reflective sheet, and owing to the absorption of the light by the transparent light guide plate and the light reflective sheet, the light quantity which can be transmitted to the liquid crystal portion is smaller than in the former system in which the light source is directly put under the liquid crystal portion.

In the latter system, the light reflective sheets are installed at two positions of a lamp holder portion and a lower portion of the transparent light guide plate. If the absorption of the light and the leakage of current take place, the quantity of the light which is fed to the liquid crystal display from the light reflective sheet at the lamp holder portion decreases. Therefore, a material of the lamp holder installed beside the transparent light guide plate is required to have a high light reflectance and high electrical insulating properties. In addition, the light reflective sheet installed under the transparent light guide plate is required to have a high light reflectance and a low transmittance.

Moreover, the coloring and the surface enlargement of the liquid crystal display have been demanded, and the improvement of the display quality of a liquid crystal is also required. In order to comply with these demands, it is required to feed the largest possible light to the back light for use in the liquid crystal display.

In reply to the above-mentioned themes, many light reflective sheets and the like have been suggested. For example, Japanese Patent Application Laid-open No. 161029/1988 has disclosed a biaxially stretched white polyethylene terephthalate film obtained by melting and extruding polymer chips which comprises a polyethylene terephthalate containing 5 to 30% by weight of finely particulate calcium carbonate, and this film is characterized by satisfying $a \geq 45$, $7 \leq b \leq 30$ and a log $b \geq 65$ wherein $\underline{a}$ is a whiteness degree (%) of the polymer chips and $\underline{b}$ is a void ratio (%) of the biaxially stretched film.

In the white polyethylene terephthalate film, the content of the finely particulate calcium carbonate is low, and it is at most 30% by weight. Therefore, the porosity of the biaxially stretched film is at most 30%, so that its light reflectance is low. In consequence, the white polyethylene terephthalate film is not satisfactory as the light reflective sheet.

Japanese Patent Application Laid-open No. 229053/1993 has disclosed a light reflective sheet obtained by laminating, a light reflecting film having a metallic thin film on the surface of a synthetic resin film, and a light scattering film formed by stretching a synthetic resin film containing a filler in at least a monoaxial direction. It is also described that silver or an alloy containing silver is preferably used as the metallic thin film. In the disclosed light reflective sheet, the synthetic resin film having the metallic thin film of silver or the like is used as the light reflecting film, and a porous resin sheet is used as the light scattering film. Thus, the disclosed light reflective sheet can be considered to be an excellent light reflective sheet having a high light reflection efficiency.

However, the light reflective sheet is not always satisfactory in point of light resistance to ultraviolet light and the like. If the porous resin sheet which is the light scattering film is hurt, its electrical insulating properties deteriorate. For example, when the light scattering film is used as a light reflecting member in the back light portion of the liquid crystal display, leakage current is generated, so that a good deal of electric power is consumed sometimes. In the case that the light scattering film is used as the light reflective sheet under the transparent light guide plate, the metallic thin film regularly reflects incident light. Therefor, when the light scattering film is hurt, a certain display portion alone, which receives the light regularly reflected at the hurt position, becomes particularly light, and the other portions become dark, so that a luminance unevenness might occur on a display.

Furthermore, it has also been attempted that a white polyethylene terephthalate sheet containing a white inorganic filler such as titanium dioxide is used as a light reflecting sheet. Recently, in order to permit energy saving in a liquid crystal display and to accomplish miniaturization and a thin structure of the liquid crystal display, the beacon lamp used as the light source of display has tended to be miniaturized and the lamp holder reduced to a slender size.

If said white polyethylene telephtalate film is used as the lamp holder, the stiffness of said film is too great to make a slender bent lamp holder, so the lamp holder becomes irregular in form. Therefore it is difficult to make a slender lamp holder which is suitable to throw the light on a transparent light guide plate of the liquid crystal display because of irregular form of the lamp holder. For the purpose of overcoming this drawback, it has been tried to thin the white polyethylene terephthalate sheet, but there is another problem that the light which passes through the sheet increases, so that the light reflectance efficiency deteriorates.

In Japanese Patent Application Laid-open No. 13925/1990, a metallic plate such as aluminum which is coated with a white paint has been described, and this metallic plate is used as the light reflective sheet. However, this kind of light reflective sheet is electrically conductive, and for this reason, there is a drawback that leakage current is generated owing to dielectric current from a light source and a luminous efficacy deteriorates inconveniently.

Japanese Patent Application Laid-open No. 239540/1992 has disclosed a porous film obtained by stretching a polyester film containing 2 to 25% by weight of a polyolefin, and a white polyester film obtained by laminating the porous film and a porous film formed by stretching a polyester film containing 5 to 25% by weight of inorganic particles. In examples of this publication, as a preferable embodiment of the white polyester film, a white porous film having a thickness of 188 µm is described in which a polyethylene terephthalate is used as a basic resin. However, because the basic resin is a polyester such as the polyethylene terephthalate, this porous film has a large stiffness, which leads to some problems. For example, when the above-mentioned porous film is used as the lamp holder or the like of-the liquid crystal display, a gap arises between the light source and the white sheet, so that light leaks and the quantity of the light which is transmitted to the liquid crystal display portion and the like decreases inconveniently. Alternatively, when it is used as the light reflective sheet under the transparent light guide plate, the reflection of light by the inorganic particles is extremely limited, so that the high light reflectance cannot be obtained, because any inorganic particles are not filled in the case of a single layer, or the content of the inorganic particles is as low as 5 to 25% by weight even in the case of a multilayer.

Furthermore, in Japanese Patent Application Laid-open No. 298957/1994, there has been disclosed a light reflective sheet obtained by stretching, at an area stretch magnification of 1.2 to 15 times, a resin composition comprising 75 to 25 parts by weight of a resin having a refractive index of less than 1.6 and 25 to 75 parts by weight of an inorganic filler. This light reflective sheet is an excellent light reflective sheet which can supply a high light reflectance by virtue of the irregular reflection of light on interfaces between the resin and voids formed by the stretching and by virtue of the reflection of the inorganic filler itself. In addition, it is also described that another film may be laminated, but any characteristics of films to be laminated are neither disclosed nor suggested.

SUMMARY OF THE INVENTION

A first object of the present invention is to provide a light reflective sheet having an excellent light reflectance and electrical insulating properties as well as structure holding properties. A second object of the present invention is to provide a light reflective sheet having the above-mentioned characteristics and a high UV light resistance and/or the further excellent light reflectance. A third object of the present invention is to provide a light reflector using each of the above-mentioned two kinds of light reflective sheets.

The present inventors have intensively investigated, and as a result, it has been found that a light reflective sheet which can solve the above-mentioned problems can be obtained by laminating a protective layer having a specific light transmittance on one surface or both the surfaces of a porous resin sheet obtained by stretching a polyolefin resin sheet containing a specific amount of an inorganic filler, and the light reflective sheet is desirable as a material for a light reflector. In consequence, the present invention has now been attained.

That is to say, the first invention of the present application is directed to a light reflective sheet which comprises a porous resin sheet and a protective layer laminated on at least one surface of the porous resin sheet; the porous resin sheet comprising a polyolefin resin and 100 to 300 parts by weight of a finely powdery inorganic filler with respect to 100 parts by weight of at least a polyolefin resin; the porous resin sheet being stretched at an area stretch magnification of 1.5 to 20 times; the light reflectance of the porous resin sheet at a wave length of 550 nm being 95% or more; the stiffness of the light reflective sheet being at least 50 mm.

The porous resin sheet having a high light reflectance is a flexible and extremely useful light reflective sheet, but in certain uses, the light reflective sheet having the high stiffness is required. Thus, the light reflective sheet regarding this invention is characterized by laminating the protective layer having the high stiffness on at least one surface of the porous resin sheet to improve the stiffness of the light reflective sheet.

Figure 1:
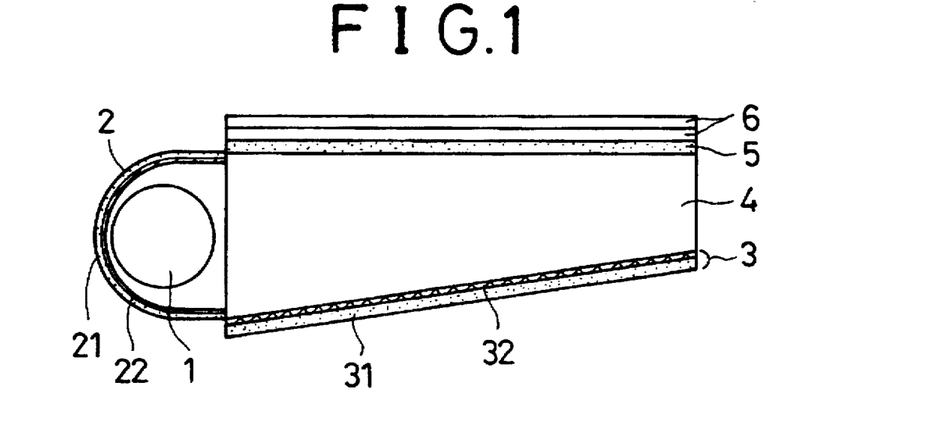
FIG. 1 is a sectional view illustrating one embodiment of a back light unit in a liquid crystal display in which a light source is installed beside a transparent light guide plate.
Figure 2:
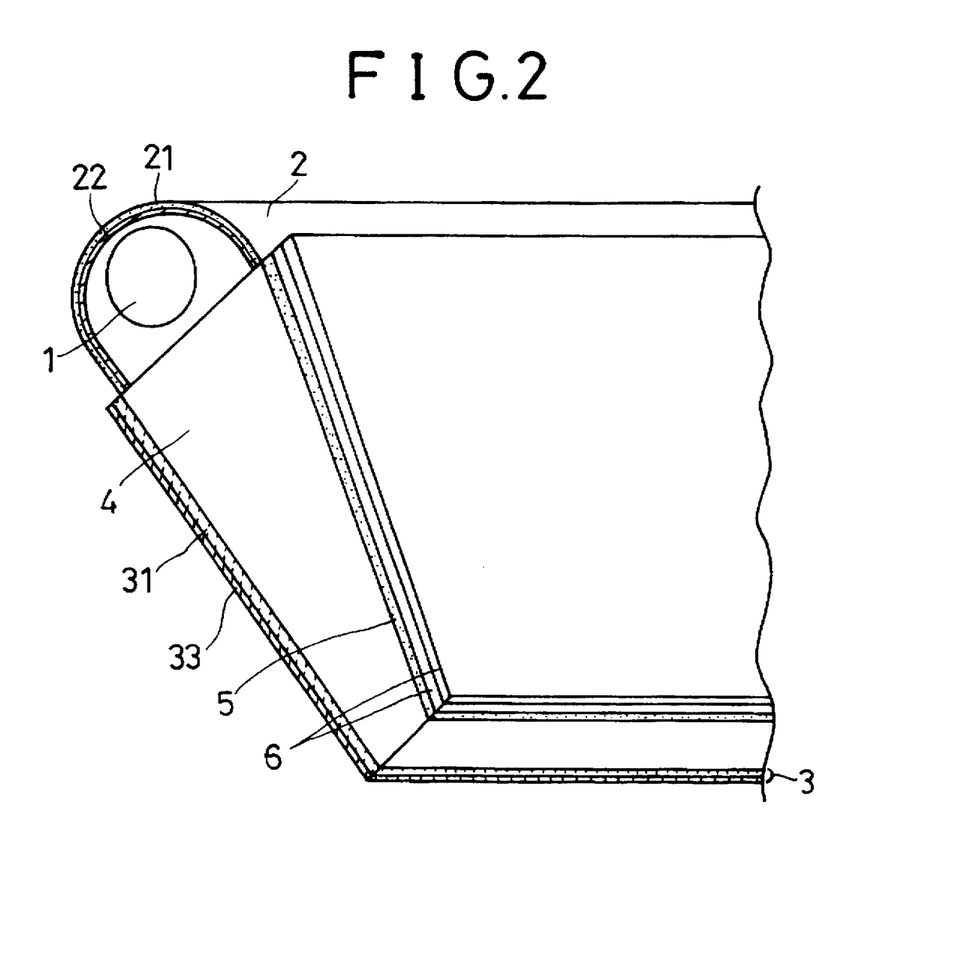
FIG. 2 is a perspective view illustrating one embodiment of the back light unit further equiped a light leakage preventing auxiliary layer in the liquid crystal display shown in FIG. 1.

SYMBOLS USED IN FIGS. 1 and 2:

1 . . . Light source
2 . . . Lamp holder
21 . . . Porous resin sheet
22 . . . UV light protective layer
3 . . . Light reflecting layer under transparent light guide plate
31 . . . Porous resin sheet
32 . . . UV light protective layer
33 . . . Light leakage preventing auxiliary layer
4 . . . Transparent light guide plate
5 . . . Light diffusing sheet
6 . . . Lens sheet.

DESCRIPTION OF THE PREFERRED EMBODIMENTS

The second invention of the present application is directed to a light reflective sheet wherein the protective layer of the first invention is a UV light protective layer which increases the stiffness of the light reflective sheet up to 50 to 150 mm and which has a function as the UV light protective layer; the total light transmittance of the UV light protective layer is 80% or more; the total reflectance of a light beam having a wave length of 550 nm irradiated on the surface of the UV light protective layer of the light reflective sheet is 95% or more; and after the surface of the UV light protective layer of the light reflective sheet has been irradiated with an ultraviolet light of 400 MJ/m² at 80° C., deterioration ratios of the total reflectances of light beams having wave lengths of 450 nm and 550 nm in the light reflective sheet are both less than 10%.

The light reflective sheet regarding this invention is characterized by having a stiffness of 50 to 150 mm and characterized in that the porous resin sheet in which a light reflectance at a wave length of 550 nm is 95% or more is used as a light reflecting layer, and in that the UV light protective layer protecting the sheet from the ultraviolet light and the like and having a total light transmittance of 80% or more is laminated on at least one surface of the porous resin sheet. Since the light reflecting layer comprises the porous resin sheet, it is rich in flexibility and it has many light reflecting layer-like portions on the surface and in the interior of the layer itself, and therefore it has an excellent light reflectance. In addition, the light reflecting layer has an advantage that its reflection is due to diffusion reflection. Moreover, since the UV light protective layer having the above-mentioned characteristics is laminated on at least one surface of the porous resin sheet, the light reflective sheet is improved in both of light resistance to ultraviolet light and the like and structure holding properties.

The third invention of the present application is directed to a light reflective sheet wherein the protective layer of the first invention is a light leakage preventing auxiliary layer which increases the stiffness of the light reflective sheet comprising a porous resin sheet and the light leakage preventing auxiliary layer laminated only on the back surface of the porous resin sheet up to at least 100 mm and which has a light leakage preventing function; the total light transmittance of the light leakage preventing auxiliary layer is less than 20%; and the total reflectance of a light beam having a wave length of 550 nm irradiated on the surface of the porous resin sheet of the light reflective sheet is 95% or more.

The light reflective sheet regarding this invention is characterized in that the porous resin sheet in which the reflectance of the light beam having a wave length of 550 nm is 95% or more is used as the light reflecting layer, and in that the light reflective sheet in which the light leakage preventing auxiliary layer and structure holding having a total light transmittance of less than 20% is laminated only on the back surface of the porous resin sheet has a stiffness of at least 100 mm. Since the light reflecting layer comprises the porous resin sheet, it is rich in flexibility and it has many light reflecting layer-like portions on the surface and in the interior of the layer itself, and therefore it has an excellent light reflectance. In addition, the light reflecting layer has an advantage that its reflection is due to diffusion reflection. Moreover, since the light leakage preventing auxiliary layer having the above-mentioned characteristics is laminated the back surface of the porous resin sheet, the light transmitted through the porous resin sheet, if any, can be effectively reflected by the light leakage preventing auxiliary layer. The light reflective sheet is also improved in the structure holding properties.

The fourth invention of the present application is directed to a light reflective sheet which is a laminate comprising the porous resin sheet and the protective layers laminated on both the surfaces of the porous resin sheet; the protective layer on the surface of the porous resin sheet is a UV light protective layer having a function as the UV light protective layer and a total light transmittance of 80% or more; the protective layer on the back surface of the porous resin sheet is a light leakage preventing auxiliary layer having a light leakage preventing function; the total reflectance of a light beam having a wave length of 550 nm irradiated on the surface of the UV light protective layer of the laminate is 95% or more; after the surface of the UV light protective layer of the laminate has been irradiated with an ultraviolet light of 400 MJ/m² at 80° C., the deterioration ratios of the total reflectances of light beams having wave lengths of 450 nm and 550 nm in the light reflective sheet are both less than 10%; and the stiffness of the laminate is at least 50 mm.

The light reflective sheet regarding this invention is characterized by having the features of the second and third inventions.

Each of the above-mentioned light reflective sheets can be preferably used as a light reflective sheet of a device selected from the group consisting of back light units of liquid crystal displays, lights, copying machines, projector system displays, facsimiles and electronic blackboards.

Each of the light reflective sheets of the first, second and fourth inventions can be preferably used as a light reflective sheet for forming a lamp holder constituting the back light unit of the liquid crystal display.

Each of the light reflective sheets of the first, third and fourth inventions can be preferably used as a light reflecting layer under a transparent light guide plate constituting the back light unit of the liquid crystal display.

The fifth invention of the present application is directed to a light reflector which comprises a transparent light guide plate 4, a light reflecting layer under the transparent light guide plate 3 placed on one surface of the transparent light guide plate 4, a light diffusion sheet 5 mounted on the other surface of the transparent light guide plate 4, a lens sheet 6 placed on the surface of the light diffusion sheet 5, a light source 1 installed on at least one side of a laminate of these members 3, 4, 5 and 6, and a curved lamp holder 2 for covering the light source 1 in FIG. 1, the light reflective sheet of the first, the second or the fourth invention being used as the lamp holder 2; and/or the light reflective sheet of the first, the third or the fourth invention being used as the light reflecting layer under the transparent light guide plate 3.

The sixth invention of the present application is directed to a light reflector in which the light reflective sheet regarding the second or the fourth invention is used as the lamp holder of the light reflector; and the light reflective sheet regarding the third or the fourth invention is used as the light reflecting layer under the transparent light guide plate of the light reflector. The features of the light reflector regarding this invention reside in that the porous resin sheet in which the reflectance of a light beam having a wave length of 550 nm is 95% or more is used as a light reflecting layer, and the light reflective sheet having a stiffness of 50 to 150 mm in which a UV light protective layer having a total light transmittance of 80% or more for protecting the sheet from ultraviolet light and the like is laminated on at least one surface of the porous resin sheet is used as the lamp holder, and in that the porous resin sheet in which the reflectance of the light beam having a wave length of 550 nm is 95% or more is used as the light reflecting layer, and the light reflective sheet having a stiffness of at least 50 mm in which a light leakage preventing auxiliary layer and structure holding having a total light transmittance of less than 20% is laminated on the back surface of the porous resin sheet is used as the light reflecting layer under the transparent light guide plate. Since the light reflecting layer which is the lamp holder or the light reflecting layer under the transparent light guide plate comprises the above-mentioned porous resin sheet, and it is rich in flexibility and it has many light reflecting layer-like portions on the surface and in the interior of the layer itself, and therefore it has an excellent light reflectence. In addition, the light reflecting layer has an advantage that its reflection is due to diffusion reflection. Moreover, since the UV light protective layer having the above-mentioned characteristics is laminated on at least one surface of the porous resin sheet constituting the light reflective sheet which can be used as the lamp holder, the light reflector is improved in both of light resistance to ultraviolet light and the like and structure holding properties. Furthermore, since the light leakage preventing auxiliary layer having the above-mentioned characteristics is laminated on the back surface of the porous resin sheet constituting the light reflective sheet which can be used as the light reflecting layer under the transparent light guide plate, the light transmitted through the porous resin sheet, if any, can be effectively reflected by the light leakage preventing auxiliary layer. The light reflector is also improved in the structure holding properties.

An embodiment of the present invention will be described in more detail.

A porous resin sheet of a light reflective sheet according to the present invention can be prepared by adding a specific amount of a finely powdery inorganic filler to a polyolefin resin, mixing them to obtain a resin composition, molding an unstretched sheet from the obtained resin composition by, for example, melt extrusion, and then monoaxially or biaxially stretching the unstretched sheet. The employment of the polyolefin resin as a basic resin permits successfully dispersing a large amount of the undermentioned inorganic filler.

Examples of the polyolefin resin which can be used to prepare the porous resin sheet include high-density polyethylenes, low-density polyethylenes, linear low-density polyethylenes which are copolymers of ethylenes and α-olefins, polypropylenes, ethylene-propylene copolymers and poly-4-methylpentene resins. In any of these polyolefin resins, a large amount of the undermentioned finely powdery inorganic filler can be successfully dispersed, and what is better, the obtained porous resin sheet is advantageously rich in flexibility.

The molecular weight of the polyolefin resin has an influence on the moldability of the sheet, and if the molecular weight of the polyolefin resin is too high or too low, the moldability of the sheet deteriorates. In view of this fact, it is preferred that a melt index (hereinafter referred to as "MI") which is a parameter of the molecular weight is in the range of from 0.5 to 7 g/10 min (190° C., load: 2.16 kg) in the case of the polyethylene resin, in the range of from 1 to 10 g/10 min (230° C., load: 2.16 kg) in the case of the polypropylene resin, or in the range of from 10 to 70 g/10 min (260° C., load: 5.0 kg) in the case of the poly-4-methylpentene resin.

In this connection, the MIs of the polyolefin resin in the present invention are values measured in accordance with a procedure prescribed in ASTM D-1238 under the above-mentioned conditions.

As the finely powdery inorganic filler which can be used in the present invention, metal salts, metal hydroxides and metal oxides are preferable. Examples of these compounds include metal salts such as barium sulfate, calcium sulfate, magnesium sulfate, aluminum sulfate, barium carbonate, calcium carbonate, magnesium chloride, magnesium carbonate and basic magnesium carbonate, metal hydroxides such as magnesium hydroxide, aluminum hydroxide and calcium hydroxide, and metal oxides such as calcium oxide, zinc oxide, magnesium oxide, titanium oxide, alumina and silica. In addition, clays such as calcium silicate, cements, zeolites and talc are also usable.

Of these enumerated inorganic fillers, barium sulfate, calcium carbonate, titanium oxide and magnesium hydroxide are preferable from the viewpoints of all of miscibility with and dispersibility in the polyolefin resin, the stretchability of the sheet, the void formability and porosity of the obtained porous resin sheet and the like. More preferable are barium sulfate and calcium carbonate, and most preferable is barium sulfate. When barium sulfate or calcium carbonate is used, precipitated barium sulfate or precipitated calcium carbonate is preferable, because it is excellent in dispersibility in and miscibility with the polyolefin resin.

Furthermore, the particle size of the finely powdery inorganic filler has an influence on the surface state of the obtained porous sheet, and in consideration of this fact, the average particle size of the finely powdery inorganic filler is preferably in the range of from about 0.1 to 7 µm, more preferably from 0.2 to 5 µm.

The amount of the finely powdery inorganic filler to be added has an influence on the light reflectance of the obtained porous sheet. If the amount of the finely powdery inorganic filler is small, the porosity of the obtained porous resin sheet is low, and conversely if it is large, the porosity is high. In the porous resin sheet having the low porosity, the quantity of light reflected on interfaces between resin layers and air layers decreases, and so the porous resin sheet having the high light reflectance cannot be obtained. Therefore, the porous resin sheet suitable for the light reflective sheet preferably has the proper porosity and the high light reflectance. If the amount of the finely powdery inorganic filler to be added is large, the porosity of the porous sheet increases but the productivity of the sheet and the strength of the porous resin sheet deteriorate. In view of these points, the amount of the finely powdery inorganic filler to be added is in the range of from 100 to 300 parts by weight with respect to 100 parts by weight of the polyolefin resin.

When the finely powdery inorganic filler is barium sulfate, the amount of this filler to be added is in the range of from 180 to 300 parts by weight, preferably from 180 to 250 parts by weight, with respect to 100 parts by weight of the polyolefin resin. When the finely powdery inorganic filler other than barium sulfate is used, its amount is preferably in the range of from 120 to 200 parts by weight with respect to 100 parts by weight of the polyolefin resin.

For the formation of the porous resin sheet for use in the light reflective sheet of the present invention, the resin composition is used which can be obtained by adding the above-mentioned finely powdery inorganic filler to the polyolefin resin and then mixing them, but some additives may be added to the composition, so far as the object of the present invention is not impaired. Examples of the additives include a stabilizer, a lubricant, a dispersant, an ultraviolet absorber, a white pigment and a fluorescent brightener.

Of these other additives, the additive having an ultraviolet absorbing ability can preferably be added. Typical examples of the additive having the ultraviolet absorbing ability include benzophenone compounds such as 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-carboxybenzophenone, 2-hydroxy-4-n-octoxybenzophenone, 2,2',4,4'-tetrahydroxybenzophenone, 4-dodecyloxy-2-hydroxybenzophenone and bis(5-benzoyl-4-hydroxy-2-methoxyphenyl)methane, and benzotriazole compounds such as 2-(2'-hydroxy-5'-methylphenyl) benzotriazole, 2-(2'-hydroxy-3',5'-di-tert-butylphenyl) benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-tert-octylphenyl)benzotriazole, 2-(2'-hydroxy-3',5'-di-tert-amylphenyl)benzotriazole, 2-[2'-hydroxy-3'-(3",4",5",6"-tetrahydrophthalimidomethyl)-5'-methylphenyl] benzotriazole, 2,2'-methylenebis[4-(1,1,3,3,-tetramethylbutyl)-6-(2H-benzotriazol-2-yl)phenol].

The amount of the additive, for example, the ultraviolet absorber to be added is in the range of from 0.01 to 5 parts by weight, preferably from 0.01 to 2 parts by weight with respect to 100 parts by weight of the polyolefin resin.

No particular restriction is put on a method for preparing the resin composition by adding the finely powdery inorganic filler and if necessary, an ultraviolet absorber, a stabilizer, a lubricant, a dispersant, a white pigment, a fluorescent brightener and other additives to the polyolefin resin, and then mixing them. For example, there can be used a method which comprises mixing these materials at room temperature or a temperature in the vicinity of room temperature by the use of a ribbon blender, a Henschel mixer, a supermixer or a tumbling mixer.

After mixing, kneading, melting and extruding the mixture in a temperature range of from a temperature higher than a melting point or a softening point of the polyolefin resin, preferably a temperature higher than the melting point or the softening point 20° C. or more to a temperature lower than a decomposition temperature of the polyolefin resin by the use of a single screw extruder or a twin-screw extruder equipped with a strand die to form molten strands, cooling, and then cutting them to form pellets. In order to uniformly disperse and mix the finely powdery inorganic filler in and with the polyolefin resin, the method which comprises forming the pellets is preferable.

No particular restriction is put on a method for molding a sheet from the thus obtained polyolefin resin composition, either. For example, there can be used a known method such as an extrusion method using a single screw extruder or a twin-screw extruder equipped with a T-die, an inflation molding method using an extruder equipped with a circular die or a calender molding method.

A temperature for the sheet molding depends upon the kind of selected polyolefin resin, but it is usually in a temperature range of from a temperature higher than a melting point or a softening point of the resin to be used, preferably a temperature higher than the melting point or the softening point by 20° C. or more to a temperature lower than a decomposition temperature of the polyolefin resin.

The thus obtained unstretched resin sheet is then stretched in at least a monoaxial direction by a known method such as a roll method or a tenter method. The stretching may be carried out in one step or in plural steps. Alternatively, the stretching may be done in a biaxial direction. After the stretching, a heat fixing treatment may be carried out so as to stabilize the state of obtained voids, as needed.

In order to obtain the porous resin sheet having the preferable porosity by carrying out the uniform stretching, while the sheet is prevented from cutting during the stretching, a stretching temperature is preferably less than a vicat softening point of the resin (a value measured in accordance with a procedure prescribed in JIS K-6760).

Furthermore, a stretch magnification has an influence on the porosity of the stretched sheet, as in the case of the amount of the above-mentioned finely powdery inorganic filler to be added. If the stretch magnification is low, the porosity of the stretched sheet decreases, and if it is high, the porosity increases. However, if the stretch magnification is too high, the sheet is unpreferably cut during the stretching on occasion. From these viewpoints, the stretch magnification is preferably in the range of from 1.5 to 20 times, more preferably from 2 to 15 times in terms of an area magnification. Concretely, in the case of the monoaxial stretching, the stretch magnification is preferably in the range from 1.5 to 8 times, more preferably 2 to 7.5 times. In the case of the biaxial stretching, the stretch magnification is preferably in the range of 1.5 to 7 times in one direction and in the range of from 1.1 to 3 times in a direction at right angles thereto. More preferably, the stretch magnification is in the range of 2 to 6.5 times in one direction and in the range of from 1.1 to 2.5 times in a direction at right angles thereto.

Prior to the stretching, an embossing treatment may be applied to the surface of the unstretched film by the use of an embossing roll or the like. Alternatively, after the stretching, the embossing treatment may be applied to the surface of the porous resin sheet.

If the thickness of the porous resin sheet is insufficient, the light transmittance increases, so that the light reflectance tends to deteriorate. Conversely, if the porous resin sheet is thick, the light reflectance does not change, but the productivity of the sheet deteriorates. Therefore, the thickness of the porous resin sheet which can be used as the light reflective sheet is usually in the range of from 50 to 500 µm, preferably from 50 to 400 µm, more preferably from 50 to 300 µm.

The porous resin sheet which can be obtained from the above-mentioned composition under the preparing conditions has a porosity of 40% or more. In using the porous resin sheet as the light reflective sheet, it is desired that the porous resin sheet has the high light reflectance. If the porosity of the porous resin sheet is less than 40%, interfaces between resin layers and air layers decrease, so that the light reflectance deteriorates. With regard to the porous resin sheet which can be used as the light reflective sheet, it is preferred that its porosity is at least 40% or more and its reflectance of light having a wave length of 550 nm is 95% or more. The higher the porosity of the porous resin sheet which can be used as the light reflectance is, the better, but the upper limit of the porosity is about 70% from the viewpoints of the moldability and stretchability of the stretched sheet and the like. Therefore, the porosity of the porous resin sheet obtained by the above-mentioned method is preferably in the range of from 40 to 70%, more preferably from 40 to 60%.

As a protective layer which will be laminated on the surface and/or the back surface of the porous resin sheet, there can be used, for example, a resin film obtained by molding a thermoplastic resin or the like by a known method such as an extrusion method using a single screw extruder or a twin-screw extruder equipped with a T-die, an inflation molding method using an extruder equipped with a circular die or a calender molding method. Alternatively, the protective layer may be a resin film formed by applying an organic solvent solution containing the above-mentioned resin onto the surface and/or the back surface of the porous resin sheet, and then drying it.

Examples of the resin which can be used for the formation of the protective layer include polyester resins such as polyethylene terephthalate and polybutylene terephthalate, polyvinyl acetate resins, polyacrylate resins such as polymethyl acrylate and polyethyl acrylate, polymethacrylate resins such as polymethyl methacrylate, fluororesins such as polytetrafluoroethylene, polychlorotrifluoroethylene, polyvinylidene fluoride, polyvinyl fluoride and a copolymer of tetrafluoroethylene and hexafluoropropylene, polyacrylonitrile resins, silicone resins, and polyamide resins such as 6-nylon, 6,6-nylon, 6,10-nylon, 11-nylon and 12-nylon.

Above all, preferable are polyester resins such as polyethylene terephthalate and polybutylene terephthalate, polyacrylic resins such as polymethyl acrylate, polyethyl acrylate and polymethyl methacrylate, and silicone resins.

A temperature at which the resin film is molded from the above-mentioned resin depends upon the kind of selected thermoplastic resin, but it is usually in a temperature range of from a temperature higher than a melting point or a softening point of the resin to be used, preferably a temperature higher than the melting point or the softening point by 20° C. or more to a temperature lower than a decomposition temperature of the resin.

The resin film which can be used as the protective layer may be a stretched film or an unstretched film. The stretched film can be obtained by stretching the resin in at least a monoaxial direction in accordance with a known method such as a roll method or a tenter method. The stretching may be carried out in one step or in plural steps. Alternatively, the stretching may be done in a biaxial direction. After the stretching, a heat fixing treatment may be carried out so as to stabilize the state of obtained voids, as needed. Stretch magnification is preferably in the range of from 1.5 to 10 times in terms of an area magnification. Concretely, in the case of the monoaxial stretching, the stretch magnification is preferably in the range from 1.5 to 10 times, more preferably 2 to 7.5 times. In the case of the biaxial stretching, the stretch magnification is preferably in the range of 1.5 to 5 times in one direction and in the range of from 1.1 to 3 times in a direction at right angles thereto. More preferably, the stretch magnification is in the range of 2 to 4 times in one direction and in the range of from about 1.1 to 2.5 times in a direction at right angles thereto.

The light reflective sheet of the present invention can be prepared by laminating the thus obtained protective layer on the surface and/or the back surface of the above-mentioned porous resin sheet by a hot pressing method or an adhesive method using an adhesive. Alternatively, the light reflective sheet can also be prepared by applying, onto the surface and/or the back surface of the above-mentioned porous resin sheet, a solution in which a thermoplastic resin or the like is dissolved in a solvent, and they drying the solution.

In this specification, the surface of the porous resin sheet means a surface on which light hits and reflects.

The lamination of the resin film on the porous resin sheet can be accomplished by an adhesive method using an adhesive or a fusing method using a hot pressing technique. In the case of the adhesive method, a transparent colorless adhesive having a high light resistance can be preferably used. In order to heighten adhesive strength, it is preferable to apply a corona discharge treatment onto the surface of the porous resin sheet and/or thermoplastic resin film.

In the case that the solution in which the resin is dissolved in an organic solvent is applied onto the porous resin sheet, a solution in which the above-mentioned resin is dissolved can be used. A solution concentration is preferably in the range of from about 5 to 50% by weight, more preferably from 5 to 35% by weight, in consideration of coating properties.

Examples of the organic solvent include aromatic solvents such as benzol, toluol, xylol, solvent naphtha and high solvent naphtha, alcoholic solvents such as methanol, ethanol, butyl alcohol and amyl alcohol, ester solvents such as methyl acetate, ethyl acetate, butyl acetate, amyl acetate, octyl acetate, benzyl acetate and cyclohexyl acetate, and ketone or ether solvents such as acetone, methyl acetone, methyl ethyl ketone, cyclohexanone, glycol methyl ether, glycol ethyl ether, glycol butyl ether and dioxane.

No particular restriction is put on a method of the solution application, and a known method can be used. Examples of the known method include dip coating, bar coating, spray coating, roll coating and screen coating. The solution is preferably applied so that its thickness may be uniform. After the application, the solution can be dried at a temperature of from 50° to 100° C. for a period of 1 second to 1 hour.

In the present invention, three kinds of protective layers can be laminated on the porous resin sheet.

That is to say, the first invention intends to improve the stiffness of the light reflective sheet by laminating the protective layer on the porous resin sheet, and in this case, the protective layer comprising a material having a higher stiffness than the porous resin sheet (usually, the stiffness is in the range of about 30 to 80 mm) is used. In the present invention, however, it is more preferable to use a protective layer having a function of protecting the porous resin sheet from UV in the second invention, or a protective layer having a function of light leakage prevention in the third invention.

In the second invention, a film having excellent transparency in which a total light transmittance is 80% or more is used, and this film is laminated on one surface or both the surfaces of the porous resin sheet. When the film is laminated on the surface, the light reflective sheet is used so that light may irradiate on the protective layer. This protective layer is called a UV light protective layer. The UV light protective layer has transparency that the total light transmittance is 80% or more, and the nearly colorless UV light protective layer is preferable. The thickness of the UV light protective layer is in the range of from about 1 to 100 μm, preferably from 1 to 70 μm, more preferably from 1 to 50 μm in view of the transparency of the UV light protective layer, the stiffness and the light reflectance of the obtained light reflective sheet, and the like. The lamination of the UV light protective layer on the one surface or both the surfaces of the porous resin sheet can prevent the deterioration of the porous resin sheet by ultraviolet light and the like, and can improve the structure holding of the porous resin sheet.

When the UV light protective layers are laminated on both the surfaces of the porous resin sheet in the second invention, the layer on the back surface functions as the protective layer of the first invention rather than as the UV light protective layer so as to give a reinforcement effect, and therefore the layer on the back surface may be a thermoplastic resin film having a total light transmittance of less than 80%.

However, the stiffness of the laminated light reflective sheet must not be in excess of 150 mm.

An example of such protective layer is a white polyethylene terephthalate having a thickness of about 30 to 50 μm.

If the light reflective sheet regarding the second invention in which the UV light protective layer is laminated on the one surface or both the surfaces of the porous resin sheet has the excessively large stiffness, it is difficult to form the light reflective sheet into a circular shape, when the light reflective sheet is used as, for example, a circular lamp holder of a liquid crystal display. In addition to bad workability, the lamp holder becomes irregular in form and the quantity of the light which can be transmitted to a liquid crystal display portion decreases. Accordingly, the stiffness of the light reflective sheet is preferably in the range of from about 50 to 150 mm, more preferably 73 to 150 mm.

The light reflective sheet regarding the second invention has been developed in order to improve light resistant to ultraviolet light and the like and the structure holding properties of the porous resin sheet. Thus, it is characterized in that the thermoplastic resin film is laminated as the protective layer on at least one surface of the porous resin sheet. The light resistant to the ultraviolet light and the like means that after the surface of the protective layer of the light reflective sheet has been irradiated with an ultraviolet light of 400 MJ (megaJoule)/m$^2$ at 80° C., deterioration ratios of the total reflectances of light beams having wave lengths of 450 nm and 550 nm in the light reflective sheet are preferably both less than 10%, more preferably less than 7%. If the deterioration ratios are 10% or more, the luminance of the light reflective sheet deteriorates with time in the case that light reflective sheet is actually used, so that a large amount of electric power is consumed to maintain brightness inconveniently.

Here, the ultraviolet light of 400 MJ/m$^2$ corresponds to the quantity of the ultraviolet light in the case that a specimen is irradiated with the ultraviolet light at 80° C. for about 1000 hours by the use of, for example, a UVA351 type ultraviolet lamp (main wave length: 351 nm) made by Q-panel Co., Ltd., the sample being about 10 cm away from the ultraviolet lamp. Usually, the lamp holder of a back light unit in the liquid crystal display is easily exposed to the ultraviolet light, but even when it is irradiated with the above-mentioned quantity of the ultraviolet light, any practical problem is not present, if the deterioration ratios of the total reflectances of light beams having wave lengths of 450 nm to 550 nm are both less than 10%.

In the third invention, a film having a low light transmission in which a total light transmittance is less than 20% is used as the protective layer, and this film is laminated on the back surface of the porous resin sheet. In this case, the light reflective sheet is used so that light may irradiate on the porous resin sheet. This protective layer is called a light leakage preventing auxiliary layer. In order to further heighten the reflectance of the light reflective sheet, the opaque light leakage preventing auxiliary layer preferably having a low light transmission is preferable. Its typical example is a film in which a total light transmittance is less than 20%, preferably less than 15%. When such a film having the low light transmission is laminated on the back surface of the porous resin sheet, even the light which is not reflected on the porous resin sheet layer and which is transmitted therethrough can efficiently be reflected on the film toward the porous resin sheet. Furthermore, the lamination of the light leakage preventing auxiliary layer on the back surface of the porous resin sheet can improve the structure holding properties of the porous resin sheet.

An example of the light leakage preventing auxiliary layer in which the total light transmittance is less than 20% is a film obtained by adding 5 to 70% by weight of an inorganic filler to the resin for the formation of the above-mentioned protective layer. Examples of the inorganic filler include metal salts such as barium sulfate, calcium sulfate, magnesium sulfate, aluminum sulfate, barium carbonate, calcium carbonate, magnesium chloride, magnesium carbonate and basic magnesium carbonate, metal hydroxides such as magnesium hydroxide, aluminum hydroxide and calcium hydroxide, and metal oxides such as calcium oxide, zinc oxide, magnesium oxide, titanium oxide, alumina and silica. Above all, titanium oxide and calcium carbonate are preferable.

Another example of the light leakage preventing auxiliary layer used in the third invention and the fourth invention in which the total light transmittance is less than 20% is a film obtained by stretching, in at least a monoaxial direction, a film material in which a resin compatible with the above-mentioned resin is dispersed in the above-mentioned resin, to generate voids between both the resins, thereby whitening the film. Still another example of the light leakage preventing auxiliary layer is a film formed by applying a white coating composition on the surface of the film obtained from the above-mentioned resin.

In view of the stiffness, the light reflectance and the like of the light leakage preventing auxiliary layer, the thickness of the light leakage preventing auxiliary layer is in the range of from about 30 to 150 µm, preferably from 50 to 150 µm, more preferably from 73 to 150 µm.

If the stiffness of the light reflective sheet regarding the third invention is excessively low and when this light reflective sheet is used as, for example, a light reflecting layer under a transparent light guide plate in the liquid crystal display, the structure holding properties are not sufficient, and the attachment of the sheet to a unit is difficult, which means that workability is poor. From these viewpoints, the stiffness of the light reflective sheet regarding the third invention is preferably at least 100 mm.

The thickness of the light leakage preventing auxiliary layer has an influence on the stiffness of the obtained light reflective sheet. No particular restriction is put on the upper limit of the stiffness of the light reflective sheet regarding the third invention, but the increase of the stiffness of the light reflective sheet inevitably leads to the increase of the thickness of the light leakage preventing auxiliary layer. This is not preferable for the sake of the miniaturization, weight reduction and thickness reduction of a whole light reflector. From these viewpoints, the upper limit of the thickness of the light leakage preventing auxiliary layer is preferably about 150 µm and the upper limit of the stiffness of the light reflective sheet is about 200 mm. This shall be applied to the light leakage preventing auxiliary layer which is laminated in the light reflective sheet of the fourth invention.

Additives such as an ultraviolet absorber and a stabilizer may be added to any of the above-mentioned protective layers, so far as the object of the present invention is not impaired.

The light reflective sheet of the present invention in which the protective layer is laminated on the porous resin sheet can be preferably used as, for example, a light reflective sheet or the like of the back light unit in the liquid crystal display. Concretely, the light reflective sheets regarding the first, second and fourth inventions can be each used as a lamp holder constituting the back light unit or a light reflecting layer under a transparent light guide plate in the liquid crystal display, and the light reflective sheets regarding the third and fourth inventions can be each used as the light reflecting layer under the transparent light guide plate constituting the back light unit in the liquid crystal display. More preferably, the light reflective sheet regarding the second invention can be used as the above-mentioned lamp holder, and the light reflective sheet regarding the third invention can be used as the light reflecting layer under the transparent light guide plate.

However, in the case that the light reflective sheet regarding the fourth invention is used as the lamp holder of the back light unit in the liquid crystal display, it is preferred that the thickness of the light leakage preventing auxiliary layer is suitably selected within the above-mentioned range so that the stiffness of the light reflective sheet may be in the range of from 50 to 150 mm. Furthermore, in the case that the light reflective sheet is used as the light reflecting layer under the transparent light guide plate, it is preferred that the thickness of the light leakage preventing auxiliary layer is suitably selected within the above-mentioned range so that the stiffness of the light reflective sheet may be at least 100 mm.

A porous polyolefin resin layer which can be used in the present invention has an extremely excellent light reflectivity and a low stiffness. In addition, the stiffness of the porous polyolefin resin layer can be optionally adjusted, when the protective layer is laminated thereon.

Particularly in the case that the light reflective sheet is used as a light reflective sheet having a curve whose sectional radius is 2 mm or less, the light reflective sheet is required to have such flexibility as to optionally curve the light reflective sheet itself and such stiffness as to hold the structure of the light reflective sheet itself.

The stiffness of the light reflective sheet of the present invention can be suitably adjusted by selecting a material of the protective layer and/or adjusting the thickness of the protective layer. Therefore, the light reflective sheet of the present invention can be preferably used as, for example, the lamp holder of the back light unit in the liquid crystal display.

Next, typical examples where the light reflective sheets obtained as described above are used as, for example, the lamp holder of a light source constituting the back light unit and the light reflecting layer under the transparent light guide plate in the liquid crystal display will be described with reference to attached drawings.

FIG. 1 is a sectional view of the back light unit in the typical liquid crystal display. In this drawing, the spherical portion of a light source 1 is curvedly covered with a lamp holder 2, a certain space being placed between both the members 1 and 2. The lamp holder 2 is formed from the light reflective sheet regarding the second invention. On one surface of a porous resin sheet 21, a UV light protective layer 22 is laminated, and the light source 1 and the UV light protective layer 22 are arranged so as to face each other. The light source 1 is covered with the UV light protective layer 22, a certain space being interposed therebetween, and both the ends of these members are bonded/fixed to a transparent light guide plate 4. A light reflecting layer under the transparent light guide plate 3 is formed from the light reflective sheet regarding the second invention, and it is arranged under the transparent light guide plate 4. This light reflecting layer 3 comprises a porous resin sheet 31 and a UV light protective layer 32 laminated on one surface of the porous resin sheet 31. On the transparent light guide plate 4, a light diffusion sheet 5 is placed. Furthermore, on the other surface of the light diffusion sheet 5, a lens sheet 6 is placed. In the case that the light source 1 is disposed only on one side of the transparent light guide plate 4 as shown in FIG. 1, the portion of the transparent light guide plate 4 which is close to the light source 1 is thickened, and as the transparent light guide plate 4 is away from the light source 1, its thickness is reduced. In this case, for the prevention of light leakage, light reflecting layers for sides are preferably laminated on three sides other than the side on which the light source 1 is installed. As the light reflecting layers for sides, there can be used two kinds of light reflective sheets regarding the third and fourth inventions. When the light sources 1 are installed on both the sides of the transparent light guide plate 4, the thickness of the transparent light guide plate 4 is usually constant.

FIG. 2 is a perspective view of the back light unit further equiped a light leakage preventing auxiliary layer in the liquid crystal display shown in FIG. 1. In this drawing, the lamp holder 2 is formed from the light reflective sheet regarding the second or the fourth invention. On one surface of the porous resin sheet 21, the UV light protective layer 22 is laminated, and the light source 1 and the UV light protective layer 22 are arranged so as to face each other. The light reflecting layer under the transparent light guide plate 3 is formed from the light reflective sheet regarding the third invention, and a light leakage preventing auxiliary layer 33 is laminated on the back surface of the porous resin sheet 31 so as to be placed under the transparent light guide plate 4 via the porous resin sheet 31. The other structures are similar to those of the back light unit in the liquid crystal display shown in FIG. 1.

The light reflective sheet regarding the second invention can be used as the lamp holder 2 or the light reflecting layer under the transparent light guide plate 3. Furthermore, the light reflective sheet regarding the third or the fourth invention can be used as the light reflecting layer under the transparent light guide plate 3. In preferable embodiments, the light reflective sheet of the second invention can be used as the lamp holder 2, and the light reflective sheet of the third invention can be used as the light reflecting layer under the transparent light guide plate 3.

As the light source 1, a cool cathode ray tube can usually be used. As the transparent light guide plate 4, a polymethylmethacrylate sheet can often be used. As the light diffusion sheet 5, a polyethylene terephthalate sheet or a polyethylene terephthalate film whose surface is embossed can often be used. Moreover, as the lens sheet 6, a polycarbonate sheet or a polyethylene terephthalate sheet whose surface is coated with a polycarbonate or a polyacrylate can often be used.

The light generated from the light source 1 irradiates on the lamp holder 2, the light reflecting layer under the transparent light guide plate 3, the transparent light guide plate 4 and the light diffusion sheet 5. That is to say, the light generated from the light source 1 directly irradiates on the light diffusion sheet 5, or it reflects on the lamp holder 2, partially hits on the light diffusion sheet 5 via the transparent light guide plate 4. The residue of the light passed through the transparent light guide plate 4 reflects on the light reflecting layer 3, returns to the transparent light guide plate 4, irradiates on the light diffusion sheet 5, and gets out of the system via the lens sheet 6.

The light reflective sheets regarding the present invention can be used as light reflective sheets constituting back light units of liquid crystal displays of word processors, personal computers, televisions and the like, and as light reflective sheets constituting lights, copying machines, projector system displays, facsimiles, electronic blackboards and the like. In addition, there can be provided a light reflector using the light reflective sheet of the present invention, light reflective sheets constituting back light units of liquid crystal displays of word processors, personal computers, televisions and the like equipped with the light reflector as well as lights, copying machines, projector system displays, facsimiles, electronic blackboards and the like.

Now, the present invention will be described in more detail with reference to examples. However, the scope of the present invention should not be limited to these examples.

Porosity, luminance, total light reflectance, stiffness, light reflectance, light transmittance and deterioration ratio of the light reflectance are measured by the following procedures, and an ultraviolet irradiation test is carried out in the following manner.

(1) Measurement of the porosity (%)

A porosity (C) is calculated in accordance with the formula (1)

$$C(\%)=(1-B/A)100 \quad (1)$$

wherein A is a true specific gravity of a selected resin composition; and B is a bulk specific gravity of an obtained porous resin sheet.

(2) Measurement of the luminance (relative value)

Light reflective sheets obtained in an example of the present invention or a comparative example are installed as a lamp holder and a light reflecting layer under a transparent light guide plate of a back light unit in a liquid crystal display mainly comprising a light source, the lamp holder, the transparent light guide plate, the light reflecting layer under the transparent light guide plate, a light diffusion sheet and a lens sheet, and the luminance on the transparent light guide plate is then measured by the use of a luminance meter (made by Minolta Camera Co., Ltd., model: LS-110 type). In installing the light reflective sheet, the light reflective sheet on which a UV light protective layer is laminated is arranged so that light might hit on the UV light protective layer, and the light reflective sheet on which a light leakage preventing auxiliary layer is laminated is arranged so that the light might hit on the porous resin sheet.

The luminance is represented by a relative value on the assumption that a luminance is 100 which can be measured under conditions that a white polyethylene terephthalate sheet (made by Kimoto Co., Ltd., trade name: REFWHITE RW75C) having a thickness of 113 µm is used as a lamp holder portion and a white polyethylene terephthalate (Toray Industries, Inc., trade name: E-60)having a thickness of 188 µm is used as the light reflecting layer arranged under the transparent light guide plate.

Measuring conditions:
Light source:
Cold cathode tube (beacon lamp) produced by
Toshiba Lightech Co. Model: FC2EX/200T2F
Tube diameter: 2.5 mm, Tube length: 200 mm
Current: 5 mA, Voltage: 450 V
Power draw: 2.25 W
Sample size: 220 mm×165 mm
Distance between sample and light receptive lens of luminance meter: 100 mm (3) Measurement of the total light transmittance (%)

The total light transmittance is measured by the use of a haze meter (made by Nippon Denshoku Co., Ltd., model: NDH-300A). For a protective layer onto which an organic solvent solution is applied and then dried, the measurement is made on a film obtained by applying and drying the solution on a metal plate under the same conditions.

(4) Measurement of the stiffness (mm)

The stiffness is measured in accordance with a procedure prescribed in JIS-L1096 (a cantilever method).

(5) Ultraviolet irradiation test

The surface of a protective layer of an obtained light reflective sheet is irradiated at 80° C. with ultraviolet light at 400 MJ (megaJoule) per m² by the use of an ultraviolet irradiation tester (made by Toyo Seiki Seisakusho Co., Ltd., trade name: ATLAS-UVCON, model: ASTM-G53; ultraviolet light emission lamp: made by Q-PANEL Co., Ltd., model: UVA351, main wave length: 351 nm).

(6) Measurement of the light reflectance (%)

Light reflectances of light beams having wave lengths of 300 to 800 nm are measured at the respective wave lengths in accordance with Measurement B of JIS-K7105 by the use of a spectrophotometer (made by Hitachi, Ltd., model: U-3400), and the total reflectance of the light beams having wave lengths of 450 to 550 nm is used as a typical value. The light reflectance is represented by a relative value on the assumption that a light reflectance is 100 which is measured under conditions that aluminum oxide is used as a standard reflective plate. For the light reflectance on which a UV light protective layer is laminated, the measurement is made by irradiating the UV light protective layer with the light, and for the light reflectance on which a light leakage preventing auxiliary layer is laminated, the measurement is made by irradiating the porous resin sheet with the light.

(7) Measurement of the deterioration ratio (%) of the light reflectance

For specimens subjected and not subjected to the ultraviolet irradiation test described in the paragraph (5), light reflectances are measured in accordance with the procedure described in the paragraph (6), and the deterioration ratios (%) of the total reflectances of light beams having wave lengths of 450 nm and 550 nm are then calculated.

EXAMPLE 1

230 parts by weight of precipitated barium sulfate having an average particle diameter of 0.94 µm (made by Barite Industry Co., Ltd., trade name: HD), 0.5 part by weight of an ultraviolet absorber (made by Adeca Argus Co., Ltd., trade name: MARK LA-36) and 3 parts by weight of calcium stearate were mixed with 100 parts by weight of a linear low-density polyethylene having a density of 0.92 g/cm³ and a melt index (MI) of 2 g/10 min (made by Mitsui Petrochemical Industries, Ltd., trade name: ULTZEX 2021L; hereinafter referred to as "LLDPE") by the use of a tumbling mixer to obtain a resin composition. Next, the thus obtained resin composition was formed into pellets by the use of a vented twin-screw extruder. These pellets were molten and extruded at 230° C. by the use of an extruder equipped with a T-die to obtain an unstretched sheet. Afterward, the unstretched sheet was monoaxially stretched at a stretch magnification of 6.5 times between a preheating roll and a stretching roll heated to 85° C. to obtain a porous resin sheet having a thickness shown in Table 1. The porosity and the light reflectance of the obtained porous resin sheet were evaluated in the above-mentioned manners. The results of the evaluation are shown in Table 1.

Furthermore, a polyethylene terephthalate (hereinafter referred to as "PET") film (made by Diafoil Hoechst Co., Ltd., trade name: DIAFOIL H100C, thickness: 12 µm, total light transmittance: 90%) was bonded and laminated as a UV light protective layer on the surface of this porous resin sheet by the use of an adhesive (made by Dainichiseika Kogyo Co., Ltd., trade name: Seika Bond E-295/C-75N) to obtain a light reflective sheet 1. The light reflectance, the stiffness and the deterioration ratio of the light reflectance of this light reflective sheet 1 were measured in the above-mentioned manners, and the results are shown in Table 1.

The obtained light reflective sheet 1 was used as a lamp holder and a light reflecting layer under a transparent light guide plate of a back light unit in a liquid crystal display to set up a light reflector having the same structure as shown in FIG. 1. This light reflector was constituted so that light might hit on the UV light protective layer. The luminance of the obtained light reflector was measured in the above-mentioned manner, and the results are shown in Table 1.

EXAMPLE 2

A porous resin sheet was obtained by the same procedure as in Example 1, and an acrylic coating material (made by Sampou Chemical Laboratory Co., Ltd., trade name: SANBO-RATE, solvent: ethyl acetate, solution concentration: 10 wt %) was then applied onto the surface of the obtained porous resin sheet, followed by drying at 100° C. for 5 minutes, to form a UV light protective layer having a thickness of 5 μm and a total light transmittance of 96%, thereby obtaining a light reflective sheet 2 in which the UV light protective layer was laminated. Next, the thus obtained light reflective sheet 2 was used to set up a light reflector in the same manner as in Example 1. The porous resin sheet, the UV light protective layer, the light reflective sheet 2 and the light reflector obtained above were evaluated by the same procedure as in Example 1, and the results of the evaluation are shown in Table 1.

EXAMPLE 3

The same procedure as in Example 1 was repeated except that a blend ratio between LLDPE and barium sulfate was set to a weight ratio shown in Table 1, thereby obtaining a porous resin sheet. Next, a polymethyl methacrylate (hereinafter referred to as "PMMA") film (made by Mitsubishi Rayon Co., Ltd., trade name: ACRYPLEN HBS001, thickness: 35 μm, total light transmittance: 94%) was laminated on one surface of the obtained porous resin sheet in the same manner as in Example 1 to obtain a light reflective sheet 3. The thus obtained light reflective sheet 3 was used to set up a light reflector in the same manner as in Example 1. The porous resin sheet, the UV light protective layer, the light reflective sheet 3 and the light reflector obtained above were evaluated by the same procedure as in Example 1, and the results of the evaluation are shown in Table 1.

EXAMPLE 4

The same procedure as in Example 1 was repeated except that a propylene homopolymer having a density of 0.9 g/cm$^3$ and an MI of 1.5 g/10 min (made by Mitsui Toatsu Chemicals, Inc., trade name: NOBLEN FO-50F; hereinafter referred to as "PP") was used as a polyolefin resin, thereby obtaining a porous resin sheet having a thickness of 150 μm. Next, a polyester coating material (made by Toyobo Co., Ltd., trade name: BYLON-200) was applied onto one surface of the obtained porous resin sheet in the same manner as in Example 2, followed by drying, to form a UV light protective layer having a thickness of 40 μm and a total light transmittance of 90%, thereby obtaining a light reflective sheet 4 in which the UV light protective layer was laminated. Next, the thus obtained light reflective sheet 4 was used to set up a light reflector in the same manner as in Example 1. The porous resin sheet, the UV light protective layer, the light reflective sheet 4 and the light reflector obtained above were evaluated by the same procedure as in Example 1, and the results of the evaluation are shown in Table 1.

EXAMPLE 5

The same procedure as in Example 1 was repeated except that a propylene-ethylene copolymer having a density of 0.9 g/cm$^3$ and an MI of 1.5 g/10 min (made by Mitsui Toatsu Chemicals, Inc., trade name: MJS-G; hereinafter referred to as "EP") was used as a polyolefin resin, thereby obtaining a porous resin sheet. Next, a silicone coating material (made by Toagosei Chemical Industry Co., Ltd., trade name: SYMAC US-300) was applied onto one surface of the obtained porous resin sheet in the same manner as in Example 2, followed by drying, to form a UV light protective layer having a thickness of 20 μm and a total light transmittance of 91%, thereby obtaining a light reflective sheet 5 in which the UV light protective layer was laminated. Next, the thus obtained light reflective sheet 5 was used to set up a light reflector in the same manner as in Example 1. The porous resin sheet, the UV light protective layer, the light reflective sheet 5 and the light reflector obtained above were evaluated by the same procedure as in Example 1, and the results of the evaluation are shown in Table 1.

EXAMPLE 6

The same procedure as in Example 1 was repeated except that calcium carbonate (made by Dowa Calfin Co., Ltd., trade name: SST-40) having an average particle diameter of 1.1 μm was used as a finely powdery inorganic filler in a weight ratio shown in Table 1 and calcium stearate was replaced with castor oil (made by Ito Seiyu Co., Ltd., trade name: Hishigata Special A) in an amount of 7.5 parts by weight with respect to 100 parts by weight of a resin, thereby obtaining a porous resin sheet having a thickness of 150 μm. A PET film (made by Teijin Limited, trade name: B4X, thickness: 25 μm, total light transmittance: 89%) was laminated as a UV light protective layer on one surface of the obtained porous resin sheet in the same manner as in Example 1 to obtain a light reflective sheet 6. Next, the thus obtained light reflective sheet 6 was used to set up a light reflector in the same manner as in Example 1. The porous resin sheet, the UV light protective layer, the light reflective sheet 6 and the light reflector obtained above were evaluated by the same procedure as in Example 1, and the results of the evaluation are shown in Table 1.

EXAMPLE 7

The same procedure as in Example 1 was repeated except that a high-density polyethylene having a density of 0.954 g/cm$^3$ and an MI of 1.1 g/10 min (made by Mitsui Petrochemical Industries, Ltd., trade name: HI-ZEX 3300F; hereinafter referred to as "HDPE") was used as a polyolefin resin, thereby obtaining a porous resin sheet having a thickness of 150 μm. Next, a PMMA film (made by Mitsubishi Rayon Co., Ltd., trade name: ACRYPLEN HBC011, thickness: 17 μm, total light transmittance: 95%) was laminated on one surface of the obtained porous resin sheet in the same manner as in Example 1 to form a light reflective sheet 7. Next, the thus obtained light reflective sheet 7 was used to set up a light reflector in the same manner as in Example 1. The porous resin sheet, the UV light protective layer, the light reflective sheet 7 and the light reflector obtained above were evaluated by the same procedure as in Example 1, and the results of the evaluation are shown in Table 2.

EXAMPLE 8

The same procedure as in Example 1 was repeated except that a low-density polyethylene having a density of 0.925 g/cm$^3$ and an MI of 2 g/10 min (made by Mitsui Petrochemical Industries, Ltd., trade name: MIRASON F312; hereinafter referred to as "LDPE") was used as a polyolefin resin, thereby obtaining a porous resin sheet having a thickness of 100 μm. Next, A PET film (made by Teijin Limited, trade name: B4X, thickness: 25 μm, total light transmittance: 89%) was laminated as a UV light protective layer on one surface of the obtained porous resin sheet in the same manner as in Example 1 to form a light reflective sheet 8. Next, the thus obtained light reflective sheet 8 was used to set up a light reflector in the same manner as in Example 1. The porous resin sheet, the UV light protective layer, the light reflective sheet 8 and the light reflector obtained above were evaluated by the same procedure as in Example 1, and the results of the evaluation are shown in Table 2.

EXAMPLE 9

A white PET film containing an inorganic filler (made by Toray Industries, Inc., trade name: LUMILAR E-20, thickness: 75 μm, total light transmittance: 9.8%) was laminated as a light leakage preventing auxiliary layer on the back surface of a porous resin sheet obtained in Example 1 to obtain a light reflective sheet 9. Next, a light reflector was set up by the same procedure as in Example 1 except that the thus obtained light reflective sheet 9 was used as a light reflecting layer under a transparent light guide plate so that light might hit on the porous resin sheet of the obtained light reflective sheet 9 and a light reflective sheet 1 obtained in Example 1 was used as a lamp holder. The porous resin sheet, the UV light protective layer, the light leakage preventing auxiliary layer, the light reflective sheets 1 and 9 and the light reflector obtained above were evaluated by the same procedure as in Example 1, and the results of the evaluation are shown in Table 2.

EXAMPLE 10

A white PET film containing an inorganic filler (made by Toray Industries, Inc., trade name: LUMILAR E-20, thickness: 125 μm, total light transmittance: 5.1%) was laminated as a light leakage preventing auxiliary layer on the back surface of a porous resin sheet obtained in Example 1 to obtain a light reflective sheet 10. Next, a light reflector was set up by the same procedure as in Example 1 except that the thus obtained light reflective sheet 10 was used as a light reflecting layer under a transparent light guide plate so that light might hit on the porous resin sheet of the obtained light reflective sheet 10 and a light reflective sheet 1 obtained in Example 1 was used as a lamp holder. The porous resin sheet, the UV light protective layer, the light leakage preventing auxiliary layer, the light reflective sheets 1 and 10 and the light reflector obtained above were evaluated by the same procedure as in Example 1, and the results of an evaluation are shown in Table 2.

EXAMPLE 11

A white PET film containing an inorganic filler (made by Toray Industries, Inc., trade name: LUMILAR E-20, thickness: 50 μm, total light transmittance: 12.5%) was laminated as a light leakage preventing auxiliary layer on the back surface of a porous resin sheet obtained in Example 1 to obtain a light reflective sheet 11. Next, a light reflector was set up by the same procedure as in Example 1 except that the thus obtained light reflective sheet 11 was used as a light reflecting layer under a transparent light guide plate so that light might hit on the porous resin sheet of the light reflective sheet 11 and a light reflective sheet 1 obtained in Example 1 was used as a lamp holder. The porous resin sheet, the UV light protective layer, the light leakage preventing auxiliary layer, the light reflective sheets 1 and 11 and the light reflector obtained above were evaluated by the same procedure as in Example 1, and the results of the evaluation are shown in Table 2.

Comparative Example 1

The same procedure as in Example 1 was repeated except that a blend ratio between LLDPE and barium sulfate was set to a weight ratio shown in Table 3, thereby obtaining a porous resin sheet. Next, a PET film (made by Diafoil Hoechst Co., Ltd., trade name: DIAFOIL H100C, thickness: 12 μm, total light transmittance: 90%) was laminated as a UV light protective layer on one surface of the obtained porous resin sheet in the same manner as in Example 1 to obtain a light reflective sheet 12. The thus obtained light reflective sheet 12 was used to set up a light reflector in the same manner as in Example 1. The porous resin sheet, the UV light protective layer, the light reflective sheet 12 and the light reflector obtained above were evaluated by the same procedure as in Example 1. This light reflective sheet 12 had a low porosity and a low light reflectance. In addition, the luminance of the light reflector was also low. The results of the evaluation are shown in Table 3.

Comparative Example 2

The same procedure as in Example 1 was repeated to obtain a porous resin sheet. Next, a PMMA film (made by Mitsubishi Rayon Co., Ltd., trade name: ACRYPLEN HBC001, thickness: 120 μm, total light transmittance: 87%) was laminated as a UV light protective layer on one surface of the obtained porous resin sheet in the same manner as in Example 1 to obtain a light reflective sheet 13. The thus obtained light reflective sheet 13 was used to set up a light reflector in the same manner as in Example 1. The porous resin sheet, the UV light protective layer, the light reflective sheet and the light reflector obtained above were evaluated by the same procedure as in Example 1. The light reflectance of the sheet and the luminance of the light reflector was also low. The results of the evaluation are shown in Table 3.

Comparative Example 3

A porous resin sheet having a thickness of 50 μm was obtained by the same procedure as in Example 1, and a light reflective sheet 14 was obtained without laminating any UV light protective layer on the surface of the resin sheet. Next, the obtained light reflective sheet 14 was used to set up a light reflector in the same manner as in Example 1. The porous resin sheet, the light reflective sheet and the light reflector were evaluated by the same procedure as in Example 1 except that the surface of the porous resin sheet of the light reflective sheet 14 was directly irradiated with ultraviolet light. The results of the evaluation are shown in Table 3.

Comparative Example 4

A commercially available white PET sheet (made by Kimoto Co., Ltd., trade name: REFWHITE RW75C, a white PET sheet which was obtained by first laminating PET films containing calcium carbonate on both the surfaces of a PET film containing a polyolefin resin to form a film comprising three layers, biaxially stretching the thus formed film to obtain a stretched white PET film having a thickness of 75 μm, and then applying a titanium oxide film having a thickness of about 40 μm on one surface of the stretched white PET film) was regarded as a light reflective sheet 15. Next, this light reflective sheet 15 was used to set up a light reflector in the same manner as in Example 1. For the light reflective sheet 15 and the light reflector obtained above, evaluation was made in the same manner as in Example 1. This light reflective sheet 16 had a low reflectance and thus a low luminance as well as a low light resistance. The results of the evaluation are shown in Table 3. The luminance, the light reflectance and its deterioration ratio were the characteristics of the surface of the PET film on which titanium oxide was not applied.

EXAMPLE 12

A white PET film containing an inorganic filler (made by Toray Industries, Inc., trade name: LUMILAR E-20, thickness: 38 μm, total light transmittance: 18.4%) was laminated as a light leakage preventing auxiliary layer on a porous resin sheet of a light reflective sheet 1 obtained in Example 1 to obtain a light reflective sheet 16 in which a UV light protective layer was laminated on the surface of the porous resin sheet and the light leakage preventing auxiliary layer was laminated on the back surface of the porous resin sheet. Furthermore, a white PET film containing an inorganic filler (made by Toray Industries, Inc., trade name: LUMILAR E-20, thickness: 75 μm, total light transmittance: 9.8%) was laminated as the light leakage preventing auxiliary layer on the porous resin sheet of the light reflective sheet 1 obtained in Example 1 to obtain a light reflective sheet 17 in which the UV light protective layer was laminated on the surface of the porous resin sheet and the light leakage preventing auxiliary layer was laminated on the back surface of the porous resin sheet. The characteristics of the selected porous resin sheet, the light transmittances of light with which the UV light protective layers of the obtained light reflective sheets 16 and 17 were irradiated, the deterioration ratios of the light reflectances, and the stiffnesses of the light reflective sheets 16 and 17 were measured, and the results are shown as follows.

Porous resin sheet:

LLDPE: 100 parts by weight, BaSO$_4$: 230 parts by weight, stretch magnification: 6.5 times, thickness: 200 μm, porosity: 45%, light reflectance: 98.8%

Light reflective sheet 16:

UV light protective layer: PET film (thickness: 12 μm, total light transmittance: 90%)

Light leakage preventing auxiliary layer: white PET film containing an inorganic filler (thickness: 38 μm, total light transmittance: 18.4%)

Light reflectance: 99.0%, stiffness: 138 mm, deterioration ratio of the light reflectance: 1.8% (450 nm), 0.5% (550 nm)

Light reflective sheet 17:

UV light protective layer: PET film (thickness: 12 μm, total light transmittance: 90%)

Light leakage preventing auxiliary layer: white PET film containing an inorganic filler (thickness: 75 μm, total light transmittance: 9.8%)

Light reflectance: 99.3%, stiffness: 185 mm

Next, a light reflector was set up by the same procedure as in Example 1 except that the thus obtained light reflective sheet 16 was used as a lamp holder of a back light unit in a liquid crystal display and the obtained light reflective sheet 17 was used as a light reflecting layer under a transparent light guide plate in the liquid crystal display. In this light reflector, incidentally, the light reflective sheets 16 and 17 were installed so that the light might hit on each UV light protective layer. The luminance of the obtained light reflector was measured, and it was 125.

TABLE 1

| | | | Example | | | | | |
|---|---|---|---|---|---|---|---|---|
| | | | 1 | 2 | 3 | 4 | 5 | 6 |
| Porous resin sheet | Resin | Kind | LLDPE | LLDPE | LLDPE | PP | EP | LLDPE |
| | | Parts of weight | 100 | 100 | 100 | 100 | 100 | 100 |
| | Inorganic filler | Kind | BaSO$_4$ | BaSO$_4$ | BaSO$_4$ | BaSO$_4$ | BaSO$_4$ | CaCO$_3$ |
| | | Parts by weight | 230 | 230 | 190 | 230 | 230 | 150 |
| | Stretch magnification (times) | | 6.5 | 6.5 | 6.5 | 6.5 | 6.5 | 6.5 |
| | Thickness (μm) | | 200 | 200 | 150 | 150 | 70 | 150 |
| | Porosity (%) | | 45 | 45 | 48 | 52 | 51 | 50 |
| | Light reflectance (%) | | 98.8 | 98.8 | 97.2 | 97.9 | 96.8 | 96.7 |
| Lamp holder part | Protective layer | Kind | PET film | Acrylic coating | PMMA film | Polyester coating | Silicone coating | PET film |
| | | Thickness (μm) | 12 | 5 | 35 | 40 | 20 | 25 |
| | | Total light transmittance (%) | 90 | 96 | 94 | 90 | 91 | 89 |
| | Light reflective sheet | Light reflectance (%) | 98.6 | 98.4 | 96.3 | 96.9 | 95.9 | 96.1 |
| | | Stiffness (mm) | 95 | 75 | 95 | 80 | 74 | 105 |
| | | Deterioration of light reflectance (%) 450 nm | 1.8 | 4.0 | 1.7 | 3.0 | 4.5 | 1.5 |
| | | 550 nm | 0.5 | 3.2 | 1.4 | 2.0 | 3.7 | 0.6 |
| | | Number of light reflective sheet | 1 | 2 | 3 | 4 | 5 | 6 |
| Light reflective sheet under the transparent guide plate | Protective layer | Kind | PET film | Acrylic coating | PMMA film | Polyester coating | Silicone coating | PET film |
| | | Thickness (μm) | 12 | 5 | 35 | 40 | 20 | 25 |
| | | Total light transmittance (%) | 90 | 96 | 94 | 90 | 91 | 89 |
| | Light reflective sheet | Light reflectance (%) | 98.6 | 98.4 | 96.3 | 96.9 | 95.9 | 96.1 |
| | | Stiffness (mm) | 95 | 75 | 95 | 80 | 74 | 105 |
| | | Number of light reflective sheet | 1 | 2 | 3 | 4 | 5 | 6 |
| | Luminance | | 115 | 114 | 110 | 106 | 103 | 107 |

TABLE 2

| | | | Example | | | | |
|---|---|---|---|---|---|---|---|
| | | | 7 | 8 | 9 | 10 | 11 |
| Porous resin sheet | Resin | Kind | HDPE | LDPE | LLDPE | LLDPE | LLDPE |
| | | Parts of weight | 100 | 100 | 100 | 100 | 100 |
| | Inorganic filler | Kind | $BaSO_4$ | $BaSO_4$ | $BaSO_4$ | $BaSO_4$ | $BaSO_4$ |
| | | Parts by weight | 230 | 230 | 230 | 230 | 230 |
| | Stretch magnification (times) | | 6.5 | 6.5 | 6.5 | 6.5 | 6.5 |
| | Thickness (μm) | | 150 | 100 | 200 | 200 | 200 |
| | Porosity (%) | | 49 | 50 | 45 | 45 | 45 |
| | Light reflectance (%) | | 97.9 | 97.1 | 98.8 | 98.8 | 98.8 |
| Lamp holder part | Protective layer | Kind | PMMA film | PET film | PET film | PET film | PET film |
| | | Thickness (μm) | 17 | 25 | 12 | 12 | 12 |
| | | Total light transmittance (%) | 95 | 89 | 90 | 90 | 90 |
| | Light reflective sheet | Light reflectance (%) | 97.3 | 96.3 | 98.6 | 98.6 | 98.6 |
| | | Stiffness (mm) | 92 | 98 | 95 | 95 | 95 |
| | | Deterioration of light reflectance (%) 450 nm | 1.9 | 1.6 | 1.8 | 1.8 | 1.8 |
| | | 550 nm | 1.8 | 1.4 | 0.5 | 0.5 | 0.5 |
| | | Number of light reflective sheet | 7 | 8 | 1 | 1 | 1 |
| Light reflective sheet under the transparent guide plate | Protective layer | Kind | PMMA film | PET film | PET film | PET film | PET film |
| | | Thickness (μm) | 17 | 25 | 75 | 125 | 50 |
| | | Total light transmittance (%) | 95 | 89 | 9.8 | 5.1 | 12.5 |
| | Light reflective sheet | Light reflectance (%) | 97.3 | 96.3 | 99.4 | 99.6 | 99.3 |
| | | Stiffness (mm) | 92 | 98 | 150 | 175 | 130 |
| | | Number of light reflective sheet | 7 | 8 | 9 | 10 | 11 |
| | Luminance | | 105 | 104 | 120 | 122 | 118 |

TABLE 3

| | | | Comparative Example | | | |
|---|---|---|---|---|---|---|
| | | | 1 | 2 | 3 | 4 |
| Porous resin sheet | Resin | Kind | LLDPE | LLDPE | LLDPE | PET* |
| | | Parts of weight | 100 | 100 | 100 | 100 |
| | Inorganic filler | Kind | $BaSO_4$ | $BaSO_4$ | $BaSO_4$ | — |
| | | Parts by weight | 50 | 230 | 230 | — |
| | Stretch magnification (times) | | 6.5 | 6.5 | 6.5 | — |
| | Thickness (μm) | | 200 | 200 | 50 | 113 |
| | Porosity (%) | | 30 | 45 | 52 | — |
| | Light reflectance (%) | | 93.9 | 98.8 | 95.2 | 93.2 |
| Lamp holder part | Protective layer | Kind | PET film | PMMA film | — | — |
| | | Thickness (μm) | 12 | 120 | — | — |
| | | Total light transmittance (%) | 90 | 87 | — | — |
| | Light reflective sheet | Light reflectance (%) | 93.7 | 92.1 | 95.2 | 93.2 |
| | | Stiffness (mm) | 98 | 200 | 40 | 112 |
| | | Deterioration of light reflectance (%) 450 nm | 1.9 | 0.4 | 11.3 | 15.1 |
| | | 550 nm | 0.7 | 0.3 | 11.1 | 7.5 |
| | | Number of light reflective sheet | 12 | 13 | 14 | 15 |
| Light reflective sheet under the transparent guide plate | Protective layer | Kind | PET film | PMMA film | — | — |
| | | Thickness (μm) | 12 | 120 | — | — |
| | | Total light transmittance (%) | 90 | 87 | — | — |
| | Light reflective sheet | Light reflectance (%) | 93.7 | 92.1 | 95.2 | 93.2 |
| | | Stiffness (mm) | 98 | 200 | 40 | 112 |
| | | Number of light reflective sheet | 12 | 13 | 14 | 15 |
| | Luminance | | 97 | 98 | 101 | 85 |

*: Kimoto Co., Ltd. REFWHITE RW75C

What is claimed is:

1. A light reflective sheet which comprises a porous resin sheet and a protective layer laminated on at least one surface of the porous resin sheet; the porous resin sheet comprising a polyolefin resin and 100 to 300 parts by weight of a finely powdery inorganic filler with respect to 100 parts by weight of a polyolefin resin; the porous resin sheet being stretched at an area stretch magnification of 1.5 to 20 times; the light reflectance of the porous resin sheet at a wave length of 550 nm being 95% or more; the stiffness of the light reflective sheet being at least 50 mm.

2. The light reflective sheet according to claim 1 wherein the protective layer is a UV light protective layer which increases the stiffness of the light reflective sheet up to 50 to 150 mm and which has a function as the UV light protective layer; the total light transmittance of the UV light protective layer is 80% or more; the total reflectance of a light beam having a wave length of 550 nm irradiated on the surface of the UV light protective layer of the light reflective sheet is 95% or more; and after the surface of the UV light protective layer of the light reflective sheet has been irradiated with an ultraviolet light of 400 MJ/m$^2$ at 80° C., deterioration ratios of the total reflectances of light beams having wave lengths of 450 nm and 550 nm in the light reflective sheet are both less than 10%.

3. The light reflective sheet according to claim 1 wherein the protective layer is a light leakage preventing auxiliary layer which increases the stiffness of the light reflective sheet comprising a porous resin sheet and the light leakage preventing auxiliary layer laminated only on the back surface of the porous resin sheet up to at least 100 mm and which has a light leakage preventing function; the total light transmittance of the light leakage preventing auxiliary layer is less than 20%; and the total reflectance of a light beam having a wave length of 550 nm irradiated on the surface of the porous resin sheet of the light reflective sheet is 95% or more.

4. The light reflective sheet according to claim 1 which is a laminate comprising the porous resin sheet and the protective layers laminated on both the surfaces of the porous resin sheet; the protective layer on the surface of the porous resin sheet is a UV light protective layer having a function as the UV light protective layer and a total light transmittance of 80% or more; the protective layer on the back surface of the porous resin sheet is a light leakage preventing auxiliary layer having a light leakage preventing function; the total reflectance of a light beam having a wave length of 550 nm irradiated on the surface of the UV light protective layer of the laminate is 95% or more; after the surface of the UV light protective layer of the laminate has been irradiated with an ultraviolet light of 400 MJ/m$^2$ at 80° C., the deterioration ratios of the total reflectances of light beams having wave lengths of 450 nm and 550 nm in the light reflective sheet are both less than 10%; and the stiffness of the light reflective sheet is at least 50 mm.

5. The light reflective sheet according to claim 1 wherein the polyolefin resin is at least one resin selected from the group consisting of high-density polyethylenes, low-density polyethylenes, polypropylenes, ethylene-α-olefin copolymers and ethylene-propylene copolymers.

6. The light reflective sheet according to claim 1 wherein the finely powdery inorganic filler is at least one filler selected from the group consisting of barium sulfate, calcium carbonate, titanium oxide, magnesium carbonate, alumina, magnesium hydroxide and zinc oxide.

7. The light reflective sheet according to claim 1 wherein the porous resin sheet contains, as another additive, 0.01 to 5 parts by weight of an ultraviolet absorber with respect to 100 parts by weight of the polyolefin resin.

8. The light reflective sheet according to claim 1 wherein the porosity of the porous resin sheet is in the range of from 40 to 70%.

9. The light reflective sheet according to claim 1 wherein the thickness of the porous resin sheet is in the range of from 50 to 500 μm.

10. The light reflective sheet according to claim 4 wherein the protective layer having a function of protecting the porous resin sheet from UV is a resin film having a thickness of 1 to 100 μm selected from the group consisting of a polyester resin film, a polyacrylic resin film and a silicone resin film.

11. The light reflective sheet according to claim 4 wherein the protective layer having a light leakage preventing function is a resin film having a thickness of 30 to 150 μm which comprises a resin selected from the group consisting of a polyester resin, a polyacrylic resin and a silicone resin containing 5 to 70% by weight of an inorganic filler.

12. The light reflective sheet according to claim 11 wherein the inorganic filler is at least one filler selected from the group consisting of barium sulfate, calcium carbonate, titanium oxide, magnesium carbonate, alumina, magnesium hydroxide and zinc oxide.

13. The light reflective sheet according to claim 4 which can be used as a light reflective sheet for a device selected from the group consisting of back light units of liquid crystal displays, lights, copying machines, projector system displays, facsimiles and electronic blackboards.

14. A device selected from the group consisting of back light units of liquid crystal displays, lights, copying machines, projector system displays, facsimiles and electronic blackboards in which the light reflective sheet described in claim 4 is used.

15. The light reflective sheet according to claim 4 which can be used as a lamp holder constituting a back light unit of a liquid crystal display.

16. The light reflective sheet according to claim 4 which can be used as a light reflecting layer under a transparent light guide plate constituting a back light unit of a liquid crystal display.

17. A light reflector which comprises a transparent light guide plate 4, a light reflecting layer under the transparent light guide plate 3 placed on one surface of the transparent light guide plate 4, a light diffusion sheet 5 placed on the other surface of the transparent light guide plate 4, a lens sheet 6 placed on the surface 150 μm which comprises a resin selected from the group consisting of a polyester resin, a polyacrylic resin and a silicone resin containing 5 to 70% weight of an inorganic filler.

18. A device selected from the group consisting of back light units of liquid crystal displays, lights, copying machines, projector system displays, facsimiles and electronic blackboards in which the light reflector described in claim 17 is used.

19. The light reflective sheet according to claim 2 wherein the protective layer having a function of protecting the porous resin sheet from UV is a resin film having a thickness of 1 to 100 μm selected from the group consisting of a polyester resin film, a polyacrylic resin film and a silicone resin film.

20. The light reflective sheet according to claim 3 wherein the protective layer having a light leakage preventing function is a resin film having a thickness of 3- to of the light diffusion sheet 5, a light source 1 installed on at least one side of a laminate of these members 3, 4, 5 and 6, and a curved lamp holder 2 for covering the light source 1, a light reflective sheet comprising a porous resin sheet and a UV light protective layer having a function as the UV light protective layer laminated on the porous resin sheet being used as the lamp holder 2; and/or a light reflective sheet comprising the porous resin sheet and a light leakage preventing auxiliary layer having a light leakage preventing function laminated on the porous resin sheet being used as the light reflecting layer under the transparent light guide plate 3.

21. The light reflective sheet according to claim 20 wherein the inorganic filler is at least one filler selected from the group consisting of barium sulfate, calcium carbonate, titanium oxide, magnesium carbonate, alumina, magnesium hydroxide and zinc oxide.

22. The light reflective sheet according to claim 3 which can be used as a light reflective sheet for a device selected from the group consisting of back light units of liquid crystal displays, lights, copying machines, projector system displays, facsimiles and electronic blackboards.

23. The light reflective sheet according to claim 2 which can be used as a light reflective sheet for a device selected from the group consisting of back light units of liquid crystal displays, lights, copying machines, projector system displays, facsimiles and electronic blackboards.

24. The light reflective sheet according to claim 1 which can be used as a light reflective sheet for a device selected from the group consisting of back light units of liquid crystal displays, lights, copying machines, projector system displays, facsimiles and electronic blackboards.

25. A device selected from the group consisting of back light units of liquid crystal displays, lights, copying machines, projector system displays, facsimiles and electronic blackboards in which the light reflective sheet described in claim 3 is used.

26. A device selected from the group consisting of back light units of liquid crystal displays, lights, copying machines, projector system displays, facsimiles and electronic blackboards in which the light reflective sheet described in claim 2 is used.

27. A device selected from the group consisting of back light units of liquid crystal displays, lights, copying machines, projector system displays, facsimiles and electronic blackboards in which the light reflective sheet described in claim 1 is used.

28. The light reflective sheet according to claim 2 which can be used as a lamp holder constituting a back light unit of a liquid crystal display.

29. The light reflective sheet according to claim 1 which can be used as a lamp holder constituting a back light unit of a liquid crystal display.

30. The light reflective sheet according to claim 3 which can be used as a light reflecting layer under a transparent light guide plate constituting a back light unit of a liquid crystal display.

31. The light reflective sheet according to claim 1 which can be used as a light reflecting layer under a transparent light guide plate constituting a back light unit of a liquid crystal display.

* * * * *